2,948,803

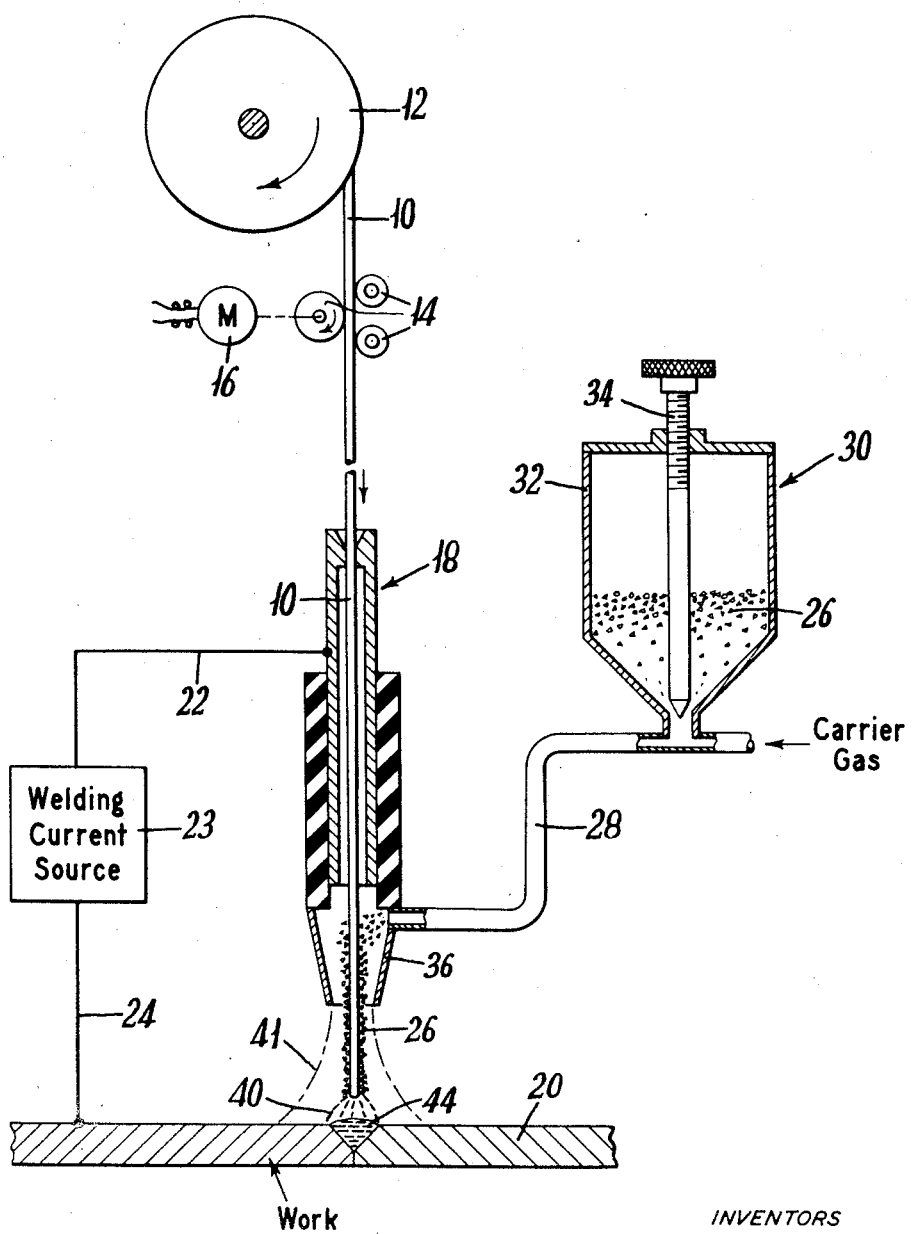

ELECTRIC ARC HIGH-ALLOY METAL DEPOSITION

Jack L. Wilson, Niagara Falls, Harry E. Rockefeller, Bronxville, and Thomas E. Butler, Niagara Falls, N.Y., assignors to Union Carbide Corporation, a corporation of New York Filed May 4, 1956, Ser. No. 582,832

2 Claims. (Cl. 219—74)

The present invention relates to gas shielded electric arc high-alloy metal deposition and more particularly, to such a process wherein a bare unalloyed metallic electrode wire is employed, and wherein the high-alloy deposited metal composition is obtained by separate alloy additions to the weld puddle.

Heretofore, in the sigma continuous consumable electrode gas shielded process it was necessary for high alloy metal deposition that the bare electrode of special alloy composition be employed. When the alloying constituents of such electrodes were included among or were combinations of chromium, molybdenum, nickel, tungsten vanadium, or in some instances, were high-carbon alloys, difficult melting and fabricating procedures in producing small diameter coiled wire were generally necessary, and the cost of such electrodes was always many times more than the total cost of the constituents in their readily available commercial form. Furthermore, while electrode compositions of a wide variety of analyses were available, many were not.

Certain compositions employed for welding by other methods could not be formed into wire of the size required for continuous electrode welding. Compositions such as "Stellite" could not be drawn into wire and were produced only as cast electrodes. Other compositions such as aluminum bronze of greater than 9% aluminum 1.5% iron, while satisfactory as a cast material, could not be satisfactorily drawn into wire for continuous electrodes. Still other compositions such as the high chromium, high carbon ferrous alloys are impossible to incorporate into wrought alloys.

Accordingly, other means have been proposed to deposit high-alloy materials by the continuous consumable electrode method. One method employs the practice of incorporating granular material into a hollow electrode. This method has been generally limited to hollow steel electrodes filled with alloying materials in granular form. For high-alloy additions relatively large diameter tube electrodes must be employed and such electrodes are not practical for manual continuous electrode welding where 3/32" diameter has been the maximum practical diameter in use. Such electrodes are costly to produce and are generally uneconomical or impractical except for certain surfacing applications. Furthermore, electrodes of this nature are easily subject to damage from improper handling and in general, impose greater restrictions in welding operations than bare solid electrodes.

Another method involves the application of the alloying elements in combination with the gas-forming and arc-stabilizing fluxing elements used in coated electrodes. Such coatings impose a size limitation for continuous electrode welding, and the necessity for providing a continuous electrical contact has made them generally impractical and uneconomical. Further, the combination of slagging materials with alloying materials in the coatings limits the accurate control of the deposited weld metal composition.

Another method of continuous electrode welding employs a separate flux containing the alloying elements which is applied ahead of the electrode such as in submerged arc welding. This method while satisfactory for low-alloy additions, has been impractical for high depositions because of the difficulty of accurately controlling the weld metal composition.

Still another method has been proposed wherein magnetic material is incorporated in a flux mixture which is fed to and attracted by a continuous consumable electrode. In this practice although the flux and alloy addition mixture may be partially aided in the protection of the weld metal by a shielding gas, the flux additions impose the same general limitations as when similar mixtures are used for coated electrode or submerged melt welding.

The object of this invention, therefore, is to provide a continuous method of metal deposition wherein high-alloy deposits can be made with greater control of the deposition analysis, over a wide range deposition composition, and in a simpler, more economic and efficient manner than hitherto possible.

Another object of the invention is to make possible the deposition of weld metal analysis hitherto impossible or impractical by previous methods.

Still another object of the invention is to make possible an "on the job" variation in the percent of alloy added to the weld metal in order to compensate for dilution with the specific composition of base material being surfaced or welded.

Other aims and advantages of the invention will be apparent from the following description and appended claims.

In accordance with the present invention a process is provided for the electric arc metal deposition, employing a bare metallic wire electrode, wherein the electrode and a metallic workpiece are connected to a source of electric power, the electrode is fed toward the workpiece to establish and maintain an arc in the deposition zone on the workpiece, and a coating of powdered alloying mixture containing a magnetic component and substantially free of slag-forming fluxing components is provided on the bare metallic wire electrode, while a stream of shielding gas is concurrently fed around the electrode to exclude atmospheric air from the deposition zone.

As the bare metallic wire electrode is fused and deposited on the high-alloy workpiece together with the coating of powdered alloying mixture, the constituents of the alloying mixture alloy with the metal of the electrode wire and a resultant alloy metal deposit is formed in situ. In this manner, when a given application of, for example, welding requires that the weld deposit be of substantially the same composition as the base plate to be compatible with it, any bare metallic filler wire having a composition of the primary constituent of the alloy base plate may be employed and the additional alloying constituents required to form a filler metal alloy of substantially the same composition as the base plate may be added through the powdered metallic alloying mixture.

Similarly, where the application is one of surfacing, any one of a number of bare metallic wire electrodes may be employed composed of the primary constituent of the desired surface alloy, with the remaining constituents of the desired surface alloy being provided through the powdered metallic alloy mixture.

The powdered metallic alloying mixture containing the magnetic component is carried by the shielding gas stream to the vicinity of the current-carrying bare metallic wire electrode at such a flow rate as to uniformly coat the electrode, adherence to the electrode being effected by the magnetic field set up about the current-carrying electrode.

The quantity of magnetic component required in the powdered alloying mixture is determined by the intensity of the magnetic field developed about the electrode by the magnitude of current employed as well as by the magnetic permeability of the magnetic component. The quantity of the magnetic component of such powdered alloying mixture must be sufficient to cause substantially all of the powdered alloying mixture to adhere to the electrode.

The powdered metallic alloying mixture may be formed by grinding the alloying components to a uniform size and adding a magnetic component. These components are carefully mixed with a suitable binder, such as sodium and/or potassium silicate. The resultant mixture is then dried and baked at 500° F. to 600° F. and then granulated to the proper mesh size for use e.g. about 20 mesh by D. The resultant product is the powdered alloying mixture employed in the process of the invention.

It is also possible to fuse a mixture where the resultant alloying mixture possesses magnetic permeability without subsequent addition of a magnetic component, such as 15% ferroaluminum and 15% ferrosilicon alloys.

The shielding gas, after conveying the powdered alloying mixture to the electrode, is distributed about the arc zone in such a manner that it serves to shield the arc and metal deposition zone from atmospheric air.

The shielding gas employed in the process of the invention may broadly comprise any shielding gas used heretofore in gas shielded metal arc welding, such as argon, helium, hydrogen, and carbon dioxide, or mixtures thereof, with or without minor amounts of oxygen up to approximately 15 percent.

It is a requisite of the process of the present invention that the powdered alloying mixture is free of substantial amounts of fluxing agents, such as silicates and the like, which are commonly employed in granulated form as the shielding media in submerged-melt metal arc welding. Such fluxing agents leave slag deposits covering the deposited metal which require a considerable amount of operator effort in removal by chipping and make it impractical to closely control the composition of the deposited metal for high-alloy deposits. In the process of the present invention, effective shielding of the arc and deposition zone from atmospheric air contamination is provided by the gaseous shielding media without requiring the use of fluxing agents which not only form slags, but affect the physical and chemical properties of the deposited metal. Deoxidizers and arc stabilizing materials may be contained in the powdered alloying mixture and the use of deoxidizers is described and claimed in copending application Serial No. 582,833, filed concurrently herewith and entitled "Electric Arc Deoxidized Metal Deposition."

The particle size of the powdered alloying mixture employed may vary over a wide range, the limits being determined by the dimensions of powder passages of the equipment and by the ability to disperse and suspend the powders in the carrier (shielding) gas stream.

It has been found necessary, for the efficient performance of the process of the invention, to correlate the electrode wire metal deposition rate with the powdered alloying mixture flow rate. As the current is increased, for a given diameter electrode at a given voltage, the metal deposition rate is proportionally increased. It has been found that, for a given shielding gas, the gas flow rate is partially dependent on metal deposition rate resulting from increased current. Accordingly, the gas flow rate is increased to provide ample shielding for the additional metal deposited. However, for higher metal deposition rates, the powdered alloying mixture flow rate must also be proportionally increased. Such correlation of electrode wire deposition rate and powdered alloying mixture flow rate, required for a given operation, within the ranges stated hereinabove, is readily determinable by one skilled in the art.

Apparatus suitable for practicing the method of the invention is schematically shown in the single figure of the drawing. As there shown a metal electrode rod or wire 10 is drawn from rod reel 12 by rod feed rolls 14, driven by variable speed motor 16 and fed through gun 18 toward workpiece 20. A power cable 22 passes from the current source 23 to gun 18 where it energizes rod 10, while a similar cable 24 is connected to workpiece 20 to complete the electrical circuit. Powdered alloying mixture 26 is borne to the gun 18 in the shielding gas stream through conduit 28. The powdered mixture is introduced into the shielding gas through powder dispenser 30 in the gas stream. Dispenser 30 comprises closed hopper 32 into which powdered mixture 26 is stored and metering pin 34 which controls the rate of powdered mixture flow to the carrier gas stream. The powder dispenser may be of any type known to the art, a gravity-feed type being shown merely by way of illustration.

The powdered alloying mixture 26 passing from hopper 32 of dispenser 30 passes into and is suspended in the carrier gas stream of conduit 28 which communicates with nozzle 36 of the gun 18.

As electrode rod 10 is struck to the workpiece 20 to initiate the arc 40 and begin the metal deposition operation, shielding gas is discharged from the nozzle around rod 10 to form a shielding envelope 41 around the arc 40. The suspended powdered alloying mixture 26 is carried into nozzle 36 of gun 18 and, due to its magnetic component, is attracted to the current-carrying electrode rod 10 and forms a uniform coating thereon.

TABLE I

| Weld No. | 1 | 2 | 3 | 4 (Two-layer) | 5 | 6 | 7 | 8 | 9 |
|---|---|---|---|---|---|---|---|---|---|
| Base Plate: | | | | | | | | | |
| Type | 304 | Mild Steel. | Mild Steel. | Mild Steel. | Mild Steel. | Mild Steel. | Aluminum Type 2S. | Nickel "A" Grade. | Cast Iron. |
| Thickness (in.) | ⅜ | ½ | ½ | ½ | ½ | ½ | ½ | ½ | ½ |
| Electrode wire: | | | | | | | | | |
| Type | No. A | No. B | No. A | No. C | No. D | No. D | No. E | No. F | No. C. |
| Dia. (in.) | 1/16 | 1/16 | 1/16 | 1/16 | 3/32 | 3/32 | 1/16 | 1/16 | 1/16. |
| Feed, g./min | 72 | 62 | 75 | {73 / 73} | 93.8 | 93.8 | 33 | 75 | 75. |
| Powder No. | I | K | L | N | O | P | Q | R | S. |
| Feed, g./min | 50.4 | 58 | 104 | {32 / 16.5} | 136 | 136 | 5.9 | 34 | 10.6. |
| Current (amp.) | 310 | 300 | 320 | 260 | 470 | 490 | 250 | 280 | 265. |
| Voltage (volts) | 25 | 29 | 34 | 26 | 27 | 28 | 27 | 25 | 26. |
| Shielding gas type | A | M-5 | M-5 | A | A | A | A | A | A. |
| Flow (c.f.h.) Nozzle | 20 | 25 | 25 | 25 | 25 | 35 | 35 | 35 | 35. |
| Powder | 10 | 10 | 10 | 10 | 10 | 15 | 15 | 10 | 10. |
| Purge | 10 | 5 | 5 | 5 | 5 | 5 | 10 | 5 | 5. |

A=Argon. M-5=5% oxygen–95% argon.

The alloying mixture is fused with the electrode rod 10 and passes into the molten deposition zone 44.

The process of the invention has been successfully employed with direct current sources at both straight and reverse polarities and with alternating current electrical sources to accomplish both high-alloy welding and high-alloy surfacing operations. Manual applications employing the process of the invention have been successfully performed in the downhand, vertical and overhead position.

Table I sets forth conditions employed in a number of welding applications of the process of the present invention.

All of the welds tabulated in Table I were made at a speed of 12 inches per minute with the exception of welds No. 5 and 6 which were made at 24 inches per minute, and 7 and 9, which were made at 8 and 3 inches per minute, respectively. In all cases the powdered alloying mixture was sized to approximately 20 mesh by D.

The following table sets forth the chemical composition of the welds obtained from the runs of Table I.

TABLE II

| Weld No. | Apparent Electrode Type | Powder No. | Powder-to-Wire Ratio | Percent Dilusion | Composition, Percent |
|---|---|---|---|---|---|
| 1 | 304 | I | 0.70 | 35 | Actual: 0.064 C, 17.95 Cr, 8.29 Ni, 1.38 Mn, 0.45 Si. Calculated: —, 18.5 Cr, 9.4 Ni, 1.6 Mn, 0.4 Si. |
| 2 | #90 | K | 0.93 | 10 | Actual: 2.88 C, 22.00 Cr. Calculated: 3.0 C, 24.0 Cr. |
| 3 | #90 | L | 1.4 | 11 | Actual: 3.01 C, 30.45 Cr. Calculated: 3.0 C, 29.8 Cr. |
| 4 | "Aluminum - Bronze," 2nd layer. | N | 0.22 | 27 | Actual: 76.12 Cu, 13.54 Al, 10.04 Fe. Calculated: 74.8 Cu, 13.3 Al, 10.5 Fe. |
| 5 | "Hastelloy" B—1st-layer. | O | 1.45 | 28 | Actual: 0.11 C, 47.18 Ni, 19.46 Mo, 32.17 Fe, 0.41 Cr, 0.27 Mn, 0.22 Si. Calculated: —, 46.5 Ni, 19.8 Mo, 31.6 Fe. |
| 6 | Hastelloy Type C | P | 1.45 | 36 | Actual: 33.43 Ni, 11.81 Cr, 7.97 Mo, 44.85 Fe, 1.24 W, 0.44 Mn, 0.42 Si. Calculated: 32.9 Ni, 10.8 Cr, 11.1 Mo, 40.8 Fe, 1.6 W. |
| 7 | Type A132 Aluminum | Q | 0.180 | 6.4 | Actual: 0.63 Cu, 7.42 Si, 1.81 Ni, 1.39 Fe, 0.85 Mg. Calculated: 0.88 Cu, 10.9 Si, 2.20 Ni, 1.1 Fe, 1.3 Mg. |
| 8 | Hastelloy Type D | R | 0.454 | 5 | Actual: 9.87 Si, 4.45 Cu. Calculated: 10.50 Si, 5.22 Cu, 1.37 Mn. |
| 9 | Cast Iron | S | 0.141 | 40 | Actual: 2.54 C, 2.18 Si, 0.40 Ni, 0.09 Mg. Calculated: 3.3 C, 0.7 Ni, 0.2 Mg, 2.5 Si. |

The results of chemical weld analysis, set forth in Table II, indicate that alloy recoveries obtained in the process of the present invention are very good and that by proper selection of powdered alloying mixtures with relationship to the electrode employed, high-alloy weld deposits with a high degree of accuracy equal to that obtainable with solid electrodes are possible. Additionally, the process of the invention permits a remarkable degree of flexibility in the production of high-alloy deposits which cannot be produced readily with solid electrodes.

In order that the above tables illustrating the welding conditions and chemical compositions of the weld deposits may be fully understood, the compositions of the welding materials there employed are defined below:

*Base plate composition*

Steel—mild steel, not analyzed
Type 304—0.073% C, 18.76% Cr, 9.96% Ni, 1.56% Mn, 0.48% Si
Type 2S aluminum—99% Al
"A" grade nickel (nominal comp.)—99.4% Ni, 0.1% Cu, 0.15% Fe, 0.25% Mn, 0.05% Si, 0.06% C, 0.005% S
Cast iron—3.44% C, 2.20% Si

*Electrode wire compositions*

No. A—0.085% C, 0.40% Mn, 0.018% Si
No. B—0.045% C, 1.20% Mn, 0.60% Si, 0.08% Ti, 0.10% Al, 0.10% Zr
No. C—0.65–0.90% Sn, 0.15–0.35% Si, 0.10–0.25% Mn, balance Cu
No. D—99.1% Ni
No. E—5.0% Si, balance Al
No. F—0.18% Si, 0.25% Mn, 0.30% Cu, 98.7% Ni, 0.12% C, 0.30% Ti, 0.06% Fe, 0.007% S, 0.09% Mg
No. G—0.15% max. C, 0.2–0.3% Si, 0.04% max. P, 1.0–1.20% Mn, 0.015% max. 0.25–0.35% Cr

*Alloying mixture compositions*

Powder mix I:
  65.6% L.C. ferrochrome (69.6% Cr, 0.067% C, 0.50% Si)
  22.6% nickel (98% Ni)
  4.6% ferrosilicon (15.1% Si, 0.74% C)
  4.0% L.C. ferromanganese (89.2% Mn, 2.1% Si, 0.06% C)
  3.2 sodium silicate (dry)

Powder mix K:
  83.0% H.C. ferrochrome (8.4% C, 66.7% Cr, 1.7% Si)
  14.6% iron
  2.4% sodium silicate (dry)

Powder mix L:
  48.8% H.C. ferrochrome (8.4% C, 66.7% Cr, 1.7% Si)
  34.2% H.C. ferrochrome (4.5% C, 68.9% Cr, 1.3% Si)
  14.6% iron
  2.4% sodium silicate (dry)

Powder mix N:
  67.8% aluminum
  29.7% iron
  2.5% sodium silicate (dry)

Powder mix O:
  90.9% nickel-molybdenum (52.51% Mo, 43.80% Ni, 1.8% Fe, 0.32% Si)
  6.3% iron
  1.0% L.C. ferrochrome (68.7% Cr, 0.064% C, 0.62% Si)
  0.5% L.C. ferromanganese (89.2% Mn, 2.1% Si, 0.06% C)
  2.2% sodium silicate (dry)

Powder mix P:
  35.4% molybdenum (85.3% Mo, 6.5% Fe, 0.9% Si Bal. in Ca, Mg, W)
  33.2% L.C. ferrochrome (68.7% Cr, 0.064% C, 0.62% Si)
  17.8% nickel (98% Ni)
  10.3% chrome-tungsten (55.1% Cr, 41.4% W, 2.0% Fe)

1.1% L.C. ferromanganese (89.2% Mn, 2.1% Si, 0.06% C)
2.2% sodium silicate (dry)

Powder mix Q:
 6.3% copper
 48.9% silicon
 17.0% 55% Mg—Al (55% Mg—45% Al)
 7.6% iron
 15.8% nickel
 0.6% low carbon FeMn (88.8% Mn, 0.4% C, 1.87% Si)
 3.8% sodium silicate (dry)

Powder mix R:
 34.8% silicon metal
 38.3% nickel metal
 3.9% manganese metal
 16.9% copper metal
 6.2% sodium silicate (dry)

Powder mix S:
 25.2% carbon
 25.2% ferrosilicon (75.92% Si, 1.07% Al, 22.0% Fe, 0.25% Ca)
 3.4% ferromanganese (89.2% Mn, 0.06% C, 2.1% Si)
 12.6% nickel-magnesium (75% Ni, 25% Mg)
 31.4% iron
 2.8% methyl methacrylate binder (dry)

*Composite compositions of electrode and alloying mixtures*

No. 43+70% powder mix I—19.1% Cr, 9.3% Ni, 0.5% Si, 1.7% Mn (type 304, weld No. 1)

No. 65+93% powder mix K—27% Cr, 3.4% C (No. 90, weld No. 2)

No. 43+140% powder mix L—33.4% Cr, 3.5% C (No. 90, weld No. 3)

No. 63+44% powder mix N—69.2% Cu, 20.8% Al, 9.1% Fe ("aluminum bronze" weld 4-first layer)

No. 63+22% powder mix N—80.9% Cu, 12.5% Al, 5.5% Fe ("aluminum bronze" weld 4-second layer)

No. 50Y+145% powder mix O—65.5% Ni, 28% Mo, 5% Fe 0.4% Cr, 0.3% Mn, 0.2% Si ("Hastelloy" B, weld 5)

No. 50Y+145% powder mix P—51.4% Ni, 18.1% Mo, 17.1% Cr, 7.5% Fe, 2.6% W ("Hastelloy" C, weld 6)

No. 43S aluminum+18% powder mix Q—11.6% Si, 12% Fe, 0.96% Cu, 1.4% Mg, 82.7% Al, 2.4% Ni (type A132 aluminum, weld 7)

No. 61 nickel+45% powder mix R—10.9% Si, 5.3% Cu, 1.3% Mn, 79.9% Ni, ("Hastelloy" D, weld 8)

No. 32 CMS steel+14.1% powder mix S—3.23% C, 2.64% Si, 1.31% Mn, 1.14% Ni, 0.38% Mg, 91.5% Fe (cast iron, weld 9)

In another example of the method of the invention surface pads (of the Stellite type of composition) were deposited on Type 1045 plate using a 1/16-inch diameter cobalt electrode and magnetic powdered alloying mixture containing cobalt as the magnetic component. The compositions of the electrode and powdered alloying mixture were as follows:

| Electrode | Percent | Alloying Mixture | Percent |
|---|---|---|---|
| C | 0.17 | High-carbon chromium | 29.6 |
| Mn | 0.36 | Low-carbon chromium | 39.2 |
| Si | 0.03 | Cobalt | 17.9 |
| Ni | 0.57 | Tungsten | 10.6 |
| Fe | 0.50 | CaSi | 2.7 |
| P | 0.010 | | |
| S | 0.036 | | |
| Co | Balance | | |

The welds were deposited at 325 to 350 amperes DCRP, 2 to 30 volts, 15 i.p.m., about 90 grams per minute of alloying mixture, representing a powder-to-electrode ratio of about 95, and employing 40 c.f.h. argon flow for shielding. The surface pads were of good hardness and quality.

What is claimed is:

1. High temperature non-ferrous alloy electric arc welding process which comprises energizing a welding arc between the end of a bare wire electrode composed essentially of cobalt and a metal workpiece, coating the end portion of said electrode with powdered non-ferrous metal particles each of which is composed mainly of cobalt, chromium and tungsten, while feeding said electrode continuously toward such arc by continuously feeding such powdered metal particles around the electrode in an annular stream of inert gas, wherein the cobalt contained in each particle acts as a magnetic component, causing such powdered metal particles to adhere as a coating on the wire electrode as the latter is so-fed toward the arc, while such annular stream of inert gas protects the such coating, arc and weld zone from the surrounding atmosphere, the ratio of metal deposited by the powdered metal being substantially equal to that deposited by said electrode to produce a solid substantially slag-free weld deposit composed of high temperature alloy that is exceptionally high in resistance to corrosion and has a very low coefficient of friction.

2. Process as defined by claim 1, in which the electrode is composed of:

| | Percent |
|---|---|
| C | 0.17 |
| Mn | 0.36 |
| Si | 0.03 |
| Ni | 0.57 |
| Fe | 0.50 |
| P | 0.010 |
| S | 0.036 |
| Co | Balance | the powdered metal particles are composed of a mixture of

| | Percent |
|---|---|
| High-carbon chromium | 29.6 |
| Low-carbon chromium | 39.2 |
| Cobalt | 17.9 |
| Tungsten | 10.6 |
| CaSi | 2.7 | and the inert gas is argon.

References Cited in the file of this patent

UNITED STATES PATENTS

| 1,347,184 | Smith | July 20, 1920 |
| 2,003,167 | Alexander | May 28, 1935 |
| 2,727,125 | Muller | Dec. 13, 1955 |
| 2,803,740 | Hyink | Aug. 20, 1957 |

FOREIGN PATENTS

| 143,331 | Great Britain | May 27, 1920 |
| 472,363 | Great Britain | Sept. 22, 1937 |
| 546,961 | Great Britain | Aug. 7, 1942 |
| 608,270 | Great Britain | Sept. 13, 1948 |